Patented Aug. 10, 1954

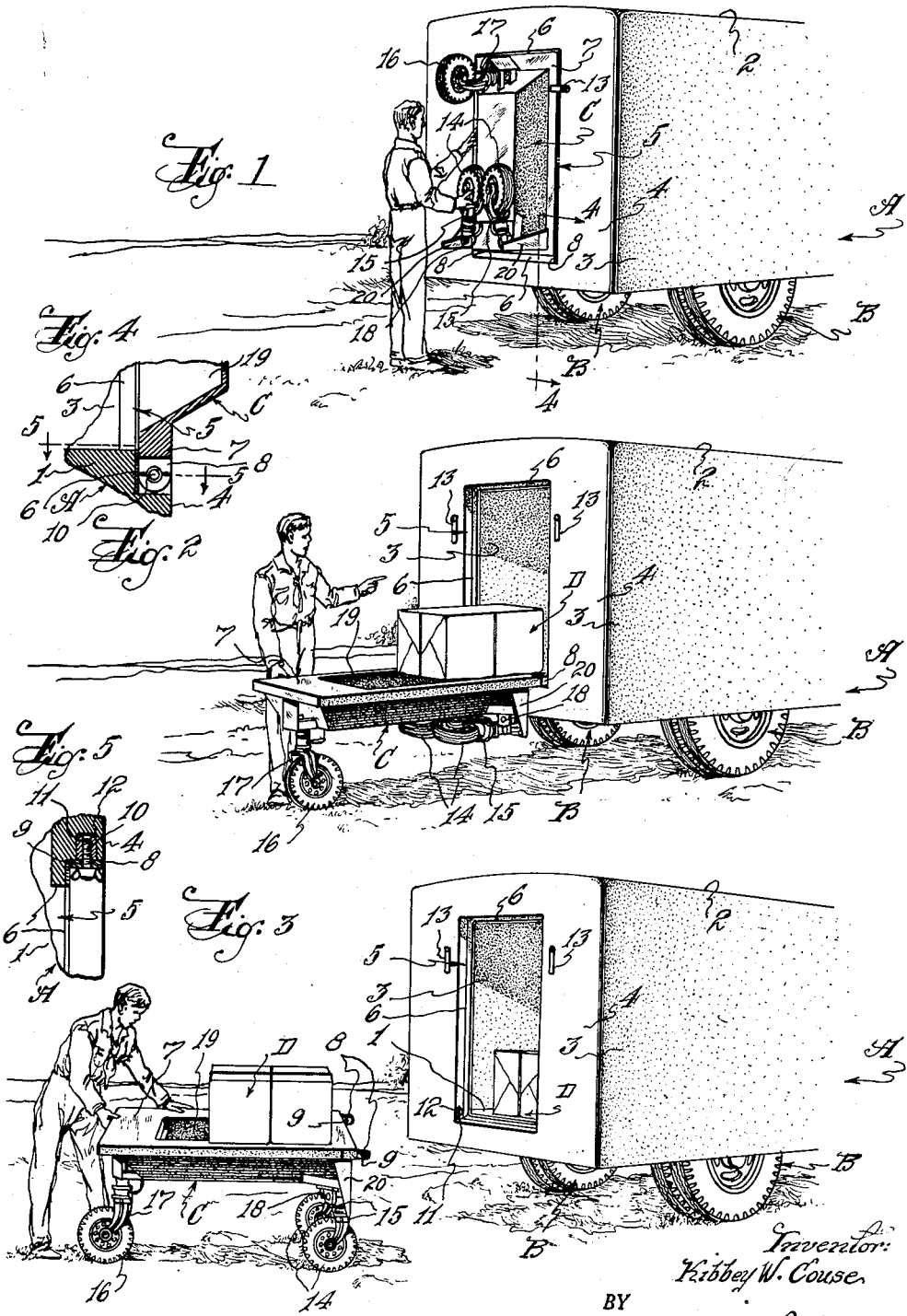

2,686,060

UNITED STATES PATENT OFFICE 2,686,060

MOTOR TRUCK WITH REAR DOOR CONVERTIBLE TO TRAILER OR DOLLY

Kibbey W. Couse, Newark, N. J.

Application September 13, 1951, Serial No. 246,449

1 Claim. (Cl. 280—30)

This invention relates in general to motor trucks of the type whose bodies have rear doors or tail gates; and more particularly the invention contemplates a truck of the van type having a covered body in which there is a rear door for loading and unloading.

A prime object of the invention is to provide a truck of this character with novel and improved means to facilitate handling of the truck load, both in loading and unloading the truck body.

Another object is to provide such a truck having a rear door opening and a door for said opening removably connected to the truck body and so constructed as to serve selectively as a door, platform, trailer or dolly.

Other objects, advantages and results of the invention will be brought out by the following description in conjunction with the accompanying drawings in which Figure 1 is a fragmentary perspective view of the lower portion of a motor truck, viewing the same from the rear end and one side thereof and showing the combined door, platform, dolly and trailer in door-closing position;

Figure 2 is a similar view showing the combined door, platform, dolly and trailer in door-opening position and serving as a loading or unloading platform, or as a trailer;

Figure 3 is a view similar to Figure 2 showing the combined door, platform, dolly and trailer detached from the truck body and serving as a dolly;

Figure 4 is an enlarged fragmentary vertical sectional view approximately on the plane of the line 4—4 of Figure 1; and Figure 5 is a fragmentary horizontal sectional view approximately on the plane of the line 5—5 of Figure 4.

Specifically describing the illustrated embodiment of the invention, the reference character A designates the body of a truck that is mounted on the wheels B as usual, the forward portion of the truck being omitted because it is unnecessary to an understanding of the invention. As shown, the truck body A is of the van type having a bottom wall 1, a top wall 2, side walls 3 and a rear end wall 4, the forward end of the body not being shown. In the rear wall 4 is a door opening 5 that has a door stop flange 6 of generally known type.

In accordance with the invention, the door opening 5 normally may be closed by a combined door, platform, dolly and trailer C one end of which is hingedly and detachably connected to the rear wall 4 of the truck body adjacent the lower end of the door opening by any suitable means.

As shown, the combined door platform, door dolly and trailer C includes a plate 7 at one end of which are hinge arms 8 having openings 9 to align with and separably receive pivot pins 10 removably fitted into pivot openings 11 in the side walls or jambs of the door opening 5. As shown, the pivot pins comprise screws that are threaded into socket members 12.

The length and width of the plate 7 are such as to close the door opening 5 when the plate is swung into vertical position into abutment with the door stop flange 6 as shown in Figure 1. Suitable means such as latches or pivoted cleats 13 are provided for holding the plate in closed position.

On the underside of the plate at the end thereof next to the truck body when the plate is attached to the body, are two caster wheels 14 whose journal brackets 15 are turnable about axes perpendicular to the axes on which said brackets are journaled on the plate 7, to positions in close proximity to the underside or rear side of the plate so that the wheels 14 selectively may be retracted to the latter positions, as shown in Figures 1 and 2, or projected from the plate to rollably support the latter as shown in Figure 3. The caster wheel assemblies 14, 15 may be constructed and connected to plate 7 in any suitable manner to render them turnable and swingable in the aforesaid manner, and may, for example, be constructed in a similar fashion to that shown in either of Patents No. 2,595,453 and No. 2,296,789 issued May 6, 1952, and September 22, 1942, respectively. At the opposite end of the plate is a single caster wheel 16 whose journal bracket 17 is unretractable so as to be permanently disposed perpendicularly to the plane of the plate with the wheel projecting from the plate as shown in all of the figures. The caster wheel assemblies 14, 15 are of a known type as already noted and no claim to novelty is made thereon per se. For purposes of illustration, each journal bracket 15 is shown as comprising two sections pivotally connected together at 18, one of which is rigidly secured to the plate while the other carries the corresponding wheel 14.

With this construction, the plate 7 may be swung downwardly about the pivot pins 10 with the caster wheels 17 in contact with the ground, so that the plate can serve both as a loading and unloading platform or as a trailer.

When desired the pivot pins 10 may be removed and the plate can be completely disconnected from the truck body so as to serve as a dolly as shown in Figure 3. If desired the plate may have a depression 19 in its upper side to receive small articles and prevent displacement thereof. The dolly can be utilized for transporting portions of the load of the truck either to or from the truck as may be desired.

As shown, the height of the dolly is such that the top surface of the plate 7 is approximately flush with or slightly higher than the upper surface of the floor 1 of the truck body when the plate is horizontal so that articles or packages D forming a part of the load of the truck can be slid from the body floor 1 onto the plate 7 or vice versa, as desired and with ease.

It will be noted that when the door is closed, as shown in Figure 1, the retractable wheels 14 are in an out of the way position relative to passersby and also to permit the plate to be swung downwardly easily to ensure proper contact of the wheel 16 with the ground when the plate is to be used as a trailer; while the wheel 16 projects from the rear of the truck body above the head of the normal human being so as to serve as a bumper to fend off collision from the rear of the truck.

It will be understood that the invention is not limited to use with van type trucks; for example, the plate may be embodied as the tail-gate of an open truck body.

It is desirable to provide short legs 20 to support the forward end of the plate 7 and to protect the wheels 14 against injury from contact with the ground when the wheels are in retracted position.

While the invention has been shown as embodied in certain structural details, it should be understood that this is primarily for the purpose of illustrating the principles of the invention and that many changes in the construction of the combined door, platform, dolly and trailer and in its connection to a truck, may be made all within the spirit and scope of the invention.

I claim:

The combination of a motor truck having a body which includes a wall having an opening, a plate, hinge means hingedly connecting said plate on a horizontal axis to said wall and including at least two separable parts, one of which is on said truck body while another is on said plate to provide for separation of said plate from the truck body, a caster journaled on the plate, the plate being swingable on the hinge means into a vertical position to close said opening and into a horizontal position to open said opening with the wheel of said castor in contact with the ground, at least two other casters on said plate so that the plate may operate as a dolly when detached from the truck.

References Cited in the file of this patent

UNITED STATES PATENTS

| Number | Name | Date |
|---|---|---|
| 2,179,005 | Brachear | Nov. 7, 1939 |
| 2,254,437 | Marney | Sept. 2, 1941 |
| 2,595,453 | Gilmore | May 6, 1952 |

FOREIGN PATENTS

| Number | Country | Date |
|---|---|---|
| 456,392 | Great Britain | Nov. 6, 1936 |